US006863763B2

(12) United States Patent
Lee et al.

(10) Patent No.: US 6,863,763 B2
(45) Date of Patent: Mar. 8, 2005

(54) HYBRID PROPELLER SHAFT MADE OF METAL AND COMPOSITE MATERIAL AND METHOD OF MANUFACTURING THE SAME

(75) Inventors: Dai Gil Lee, Daejeon (KR); Jin Kook Kim, Daejeon (KR); Hak Sung Kim, Asan-si (KR); Jong Woon Kim, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 10/429,155

(22) Filed: Apr. 30, 2003

(65) Prior Publication Data

US 2004/0082394 A1 Apr. 29, 2004

(30) Foreign Application Priority Data

Oct. 23, 2002 (KR) ................................ 10-2002-0064917
Nov. 27, 2002 (KR) ................................ 10-2002-0074399

(51) Int. Cl.[7] .............................................. B65H 81/00
(52) U.S. Cl. ....................... 156/188; 156/191; 156/194; 156/293; 464/181
(58) Field of Search ................................. 156/293, 184, 156/185, 187, 188, 191, 194, 155; 464/181

(56) References Cited

U.S. PATENT DOCUMENTS

| 3,553,978 A | | 1/1971 | Williams |
| 4,131,701 A | | 12/1978 | VanAuken |
| 4,171,626 A | | 10/1979 | Yates et al. |
| 4,173,128 A | | 11/1979 | Corvelli |
| 4,173,670 A | | 11/1979 | VanAuken |
| 4,214,932 A | | 7/1980 | VanAuken |
| 4,238,539 A | * | 12/1980 | Yates et al. .............. 464/181 |
| 4,272,971 A | | 6/1981 | Loyd et al. |
| 4,348,247 A | * | 9/1982 | Loyd et al. .............. 156/156 |
| 4,535,645 A | | 8/1985 | De Bisschop et al. |
| 4,706,364 A | * | 11/1987 | Aubry .................... 156/294 |

(List continued on next page.)

FOREIGN PATENT DOCUMENTS

| JP | 56-144924 | 11/1981 |
| KR | 10-0103245 | 5/1996 |
| KR | 10-0197355 | 6/1999 |

OTHER PUBLICATIONS

Cho, Durk H., et al "Manufacture of one piece automotive drive shafts with aluminum and composite materials" Coposite Structures, vol. 38, No. 1–4, May–Aug. 1997, pp. 309–319 (1997).

Shields, J. "Adhesives Handbook", CRC Press, 1970, pp 235–239 (1970).

Primary Examiner—Jeff H. Aftergut
(74) Attorney, Agent, or Firm—Graybeal Jackson Haley LLP

(57) ABSTRACT

The propeller shaft comprises a transmission shaft 10 consisting of a hollow metal tube 11 with excellent torque transmissibility and a composite material prepregs 12 having higher specific stiffness than a metal material and stacked to the inner surface of the metal tube, and metal yokes 40 mounted on both ends of the transmission shaft and assembled with other devices. The composite material prepregs is co-cure bonded while applying an axial compressive preload to the transmission shaft and creating a vacuum in a space between a vacuum bag inserted in the transmission shaft and the composite material prepregs of the transmission shaft. Teeth 43 or embossments 44, and adhesive-retaining grooves 45 are formed on inner surfaces of the metal yokes, so the transmission shaft is desirably compression-fitted into the metal yokes. Accordingly, the propeller shaft has advantages of securing improved impact, abrasion, and water resistance.

16 Claims, 8 Drawing Sheets

U.S. PATENT DOCUMENTS

| | | |
|---|---|---|
| 4,706,659 A | 11/1987 | Matthews et al. |
| 4,952,195 A * | 8/1990 | Traylor ..................... 464/181 |
| 4,967,617 A | 11/1990 | Maus et al. |
| 5,127,975 A | 7/1992 | Zackrisson et al. |
| 5,222,915 A | 6/1993 | Petrzelka et al. |
| 5,230,661 A * | 7/1993 | Schreiber et al. ........... 464/181 |
| 5,261,991 A | 11/1993 | Zackrisson et al. |
| 5,601,494 A | 2/1997 | Duggan |
| 5,797,180 A | 8/1998 | Buchholz |
| 5,988,300 A | 11/1999 | Pomerleau et al. |
| 6,126,770 A | 10/2000 | Lee et al. |
| 6,336,986 B1 | 1/2002 | Lee et al. |

* cited by examiner

HYBRID PROPELLER SHAFT MADE OF METAL AND COMPOSITE MATERIAL AND METHOD OF MANUFACTURING THE SAME

PRIORITY CLAIM

This application claims priority from Korean patent application Nos. 10-2002-64917 filed on Oct. 23, 2002, and 10-2002-74399 filed on Nov. 27, 2002, which are herein incorporated by reference.

BACKGROUND OF THE INVENTION

1. Field of the Invention

The present invention pertains, in general, to a propeller shaft of rear-wheel drive vehicles and a method of manufacturing the same and, in particular, to a propeller shaft, in which composite material prepregs are stacked to an inner surface of a metal tube to increase axial stiffness and fundamental natural vibration frequency of the propeller shaft and prevent its physical properties from being degraded due to external impact, and a method of manufacturing the same.

2. Description of the Prior Art

Used to transmit a rotating force from engines of rear wheel drive vehicles to rear axles, a propeller shaft conventionally consists of steel or aluminum materials. However, recently, a composite material has been used instead of the conventional steel or aluminum material as a material of the propeller shaft so as to reduce weight and improve NVH (noise, vibration, and harshness) properties of the propeller shaft, and the propeller shaft consisting of the composite material has begun to be practically installed in vehicles.

The fiber reinforced composite material such as carbon fiber polymeric matrix composites is better than the conventional steel or aluminum material in terms of specific stiffness and specific strength. Accordingly, the propeller shaft consisting of the composite material has a higher axial specific stiffness when the fiber direction is close to the axial direction than the conventional steel or aluminum materials, so its fundamental natural bending vibration frequency is higher than those of conventional materials.

However, the propeller shaft consisting of only the high performance composite material is less competitive in terms of production cost in comparison with the propeller shaft consisting of the conventional steel or aluminum material because large amount of composite material should be used in order for the propeller shaft made from the high performance composite material to have torque transmissibility sufficient to transmit the power from the engines of the vehicles to the rear wheel axles with its fundamental bending natural frequency higher than the engine rotational speed.

Much effort has been made to avoid the above disadvantage, that is to say, undesirable increase of production cost of the propeller shaft. For example, reference may be made to the patents assigned to the applicant of the present invention, Korean Pat. No. 103245, which discloses a process of manufacturing a propeller shaft consisting of a light metal material with excellent torque transmissibility (e.g.: an aluminum alloy) and a composite material with excellent specific stiffness (e.g.: unidirectional carbon fiber epoxy composite material).

The process comprises the steps of sequentially rolling a vacuum bag and a composite material prepregs around an outer surface of a mandrel, inserting the resulting mandrel into a metal tube to stack the composite material prepregs to an inner surface of the metal tube, applying high pressure air into the vacuum bag after the mandrel is removed to allow the composite material prepregs to come into close contact with the inner surface of the metal tube, and curing the composite material prepregs for a predetermined time to co-cure bond the composite material prepregs to the inner surface of the metal tube. However, this process may induce high thermal residual stresses at the interface between the composite material and the metal tube because the composite material and the metal tube have different thermal expansion coefficient values, thus causing the composite material prepregs to readily peel off from the inner surface of the metal tube upon receiving even weak external impact and allowing moisture absorption between the composite material and the metal tube, which degrades physical properties of the propeller shaft.

To avoid the above disadvantages, a high-priced waterproofing epoxy and urethane paint may be coated on the hybrid propeller shaft consisting of the metal and composite material to reduce moisture absorption between the composite material sheet and the metal tube and improve impact resistance of the propeller shaft. However, the propeller shaft coated with the above paints has a disadvantage of high production cost and increase of weight.

Meanwhile, the propeller shaft may be manufactured by stacking the composite material prepregs to the inner surface of the metal tube to form a power transmission shaft, and fitting metal yokes around both ends of the transmission shaft. In this regard, Korean Patent No. 197355 registered to the applicant of the present invention discloses a process of fitting a transmission shaft into metal yokes.

In Korean Patent No. 197355, the transmission shaft consisting of a metal tube and a composite material prepregs is fitted into the metal yokes with the use of an adhesive to manufacture a propeller shaft, but this propeller shaft is disadvantageous in that its torque transmissibility and natural vibration frequency are poor and a center of the transmission shaft is easily deviated from a desirable position. Also the propeller shaft consisting of a carbon fiber and aluminum tube with the yokes welded to the aluminum tube is poor in terms of reliability because the carbon fiber and epoxy resin are sensitive to heat when the metal yokes are welded to the transmission shaft.

Therefore, in Korean Patent No. 197355, the transmission shaft is fitted into the metal yokes after serrations are precisely formed on the inner surfaces of both ends of the transmission shaft and outer surfaces of the metal yokes. Thereby, the propeller shaft including the metal yokes forms an integrated body unlike a conventional propeller shaft composed of two pieces each having a length of 1.5 m, so it is not necessary to use a conventional yoke assembling two pieces with each other and positioned at an interface of the two pieces, bearings for supporting the shafts, and vibration-proof rubbers.

However, the propeller shaft is disadvantageous in that there is a need for sophisticated precision processing so as to desirably engage the serrations of the transmission shaft with those of the metal yokes, thereby undesirably increasing production cost and time of the propeller shaft.

SUMMARY OF THE INVENTION

Therefore, the present invention has been made keeping in mind the above disadvantages occurring in the prior arts, and an object of the present invention is to provide a propeller shaft with a composite material and a method of manufacturing the same which comprises the steps of stacking a composite material prepregs to an inner surface of a metal tube and co-cure bonding the resulting composite material prepregs while applying an axial compressive preload to the metal tube and creating the vacuum in the space between a vacuum bag inserted in the metal tube and the composite material prepregs, thereby preventing the composite material prepregs stacked to the inner surface of the metal tube from delamination to improve impact resistance of the propeller shaft and prevent degradation of physical properties of the propeller shaft due to infiltration of moisture into an interface between the composite material and the metal tube.

It is another object of the present invention to provide a propeller shaft, in which adhesive-retaining grooves are formed between embossments on inner surfaces of metal yokes, and a method of manufacturing the same. At this time, the propeller shaft of the present invention has relatively high torque transmissibility and prolonged fatigue life even though a joining length of a transmission shaft into each of the metal yokes is relatively short when the transmission shaft is compression-fitted into the metal yokes.

Based on the present invention, the above objects can be accomplished by providing a method of manufacturing a propeller shaft, which includes a transmission is shaft consisting of a metal tube and a composite material stacked to an inner surface of the metal tube, and metal yokes mounted on both ends of the transmission shaft and assembled with other devices, comprising the steps of stacking the composite material prepregs to the inner surface of the metal tube, co-cure bonding the composite material prepregs stacked to the inner surface of the metal tube while applying the axial compressive preload to the transmission shaft and creating a vacuum in the space between a vacuum bag inserted in the transmission shaft and the composite material prepregs of the transmission shaft, and compression-fitting the metal yokes around both ends of the transmission shaft.

According to an embodiment of the present invention, the stacking step comprises the first step of cutting the composite material prepregs to a desired size, the second step of wrapping the cut composite material prepregs around a mandrel, the third step of inserting the mandrel wrapped with the composite material prepregs into the metal tube, and the fourth step of stacking the composite material prepregs wrapped around the mandrel to the inner surface of the metal tube.

In the second step, a protective layer is stacked to the composite material prepregs so as to improve a damping capacity of a propeller shaft, and the composite material prepregs are wrapped around the mandrel in such a way that the protective layer is located between the composite material prepregs and the mandrel.

Additionally, the metal tube is pre-heated to help the composite material prepregs stick to the inner surface of the metal tube between the second and third steps.

Further, the mandrel rolls along the inner surface of the metal tube for the consolidation of the composite prepregs and making the prepregs come into contact with the inner surface of the metal tube in the fourth step. At this time, the metal tube is fixedly held to maintain its position.

Furthermore, the metal tube eccentrically rotates around the immobilized mandrel in the fourth step.

According to the embodiment of the present invention, the co-cure bonding step comprises the first step of fitting caps around both ends of the transmission shaft, the second step of sequentially inserting the vacuum bag and a externally threaded pre-compression shaft through central holes of the caps into the transmission shaft, the third step of rotatably fitting a jig, rotatably assembled with any one of the caps, around the pre-compression shaft, and the fourth step of rotating the jig to apply longitudinal compressive preload to the transmission shaft to eliminate residual thermal stress while creating the vacuum in the space between the vacuum bag and the composite material prepregs of the transmission shaft.

As well, it is preferable that rings or rubber plates are inserted to the caps so as to airtightly close the transmission shaft using the caps.

Additionally, a vent is preferably formed in a lateral part of each of the caps to remove air from the transmission shaft.

Further, dummy plugs are assembled with the caps and fitted around the pre-compression shaft to immovably fix the pre-compression shaft and airtightly seal intervals between the pre-compression shaft and the central holes of the caps in the second step.

Furthermore, a thrust bearing is assembled with any one of the caps and the jig in such a way that the thrust bearing is located between them to reduce torque caused by rotation of the jig in the third step.

According to another embodiment of the present invention, the stacking step comprises the steps of inserting a hollow mandrel into the vacuum bag, wrapping the composite material prepregs around the vacuum bag, and inserting the hollow mandrel wrapped with the composite material prepregs into the metal tube. At this time, the composite material prepregs are wrapped around the vacuum bag having an outer diameter almost the same as or slightly smaller than the inner diameter of the metal tube.

Further, according to another embodiment of the present invention, the co-cure bonding step comprises the first step of fitting caps around both ends of the metal tube including the hollow mandrel, the second step of inserting a pre-compression shaft into the hollow mandrel in such a way that the pre-compression shaft is inserted into central holes of the caps, the third step of rotatably fitting a jig, rotatably assembled with any one of the caps, around the pre-compression shaft, and the fourth step of rotating the jig to apply the axial compressive preload to the transmission shaft while creating a vacuum in the space between the vacuum bag and the composite material prepregs of the transmission shaft.

At this time, the metal yokes are preferably compression-fitted around the both ends of the transmission shaft while teeth or embossments formed on inner surfaces of the metal yokes bite an outer surface of the metal tube of the transmission shaft in the compression-fitting step, thus being mounted to the both ends of the transmission shaft.

Furthermore, the metal yokes are heated, compression-fitted around the both ends of the transmission shaft, and then cooled in fitting step.

Additionally, it is preferable that the metal yokes are compression-fitted around the transmission shaft after an adhesive is pasted on inner surfaces of the metal yokes or around outer surfaces of the both ends of the transmission shaft.

Moreover, rubber packings are inserted to inner surfaces of the metal yokes to prevent moisture or impurities from infiltrating into the metal yokes when the metal yokes are compression-fitted around the both ends of the transmission shaft.

The metal yokes are compression-fitted around the both ends of the transmission shaft after inserts with an outer diameter almost the same as an inner diameter of the transmission shaft are inserted into the transmission shaft, thereby a shape of the transmission shaft is desirably maintained.

Furthermore, the present invention provides a propeller shaft with a composite material including a transmission shaft consisting of a metal tube and a composite material prepregs stacked to an inner surface of the metal tube, and metal yokes mounted to both ends of the transmission shaft and assembled with other devices. The composite material prepregs is co-cure bonded while applying the axial compressive preload to the transmission shaft and creating a vacuum in a space between a vacuum bag inserted in the transmission shaft and the composite material prepregs of the transmission shaft. Additionally, bores are formed in the metal yokes to allow the metal yokes to be fitted around the transmission shaft. Furthermore, teeth or embossments, and adhesive-retaining grooves are formed on inner surfaces of the bores.

At this time, a protective layer is layered on the composite material prepregs stacked to the inner surface of the metal tube to improve a damping capacity of the propeller shaft.

It is preferable that the one-layer of composite material prepregs contacting the metal tube comprises a glass fiber polymeric matrix composite material to prevent the metal tube from galvanic corroding and to minimize residual thermal stress of the metal tube, while other layers are carbon fiber composite.

The bores of the metal yokes each comprise a guide bore part and a fitting bore part forming a step shape in conjunction with the guide bore part, the guide bore part having an inner diameter slightly larger than an outer diameter of the transmission shaft functions to guide the transmission shaft so that a central axis of the transmission shaft corresponds to those of the metal yokes when the metal yokes are is fitted into the transmission shaft, and the teeth or embossments are formed on an inner surface of the fitting bore part.

Moreover, the inner diameter of the guide bore part may be gradually decreased in a direction toward a center of an inside end of each of the metal yokes.

Additionally, a plurality of adhesive-retaining grooves are formed between a pair of adjacent embossments on the inner surface of the fitting bore part, with an adhesive filled in the adhesive-retaining grooves to attach the metal yokes to the transmission shaft.

BRIEF DESCRIPTION OF THE DRAWINGS

The above and other objects, features and other advantages of the present invention will be more clearly understood from the following detailed description taken in conjunction with the accompanying drawings, in which:

FIG. 9b is a perspective view, partly exploded away to show the interior construction of the transmission shaft compression-fitted into the metal yoke of FIG. 9a.

DETAILED DESCRIPTION OF THE INVENTION

Figure 1:
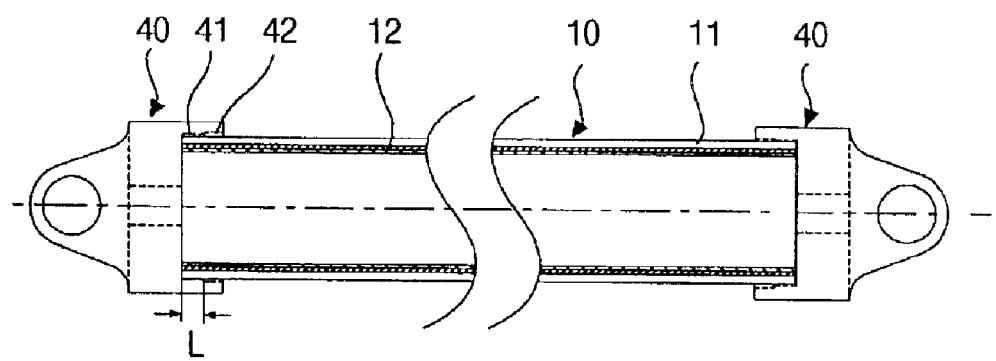
FIG. 1 illustrates a propeller shaft including a metal tube and a composite material prepregs stacked to an inner surface of the metal tube according to an embodiment of the present invention.

Reference now should be made to the drawings, in which the same reference numerals are used throughout the different drawings to designate the same or similar components.

Figure 2:
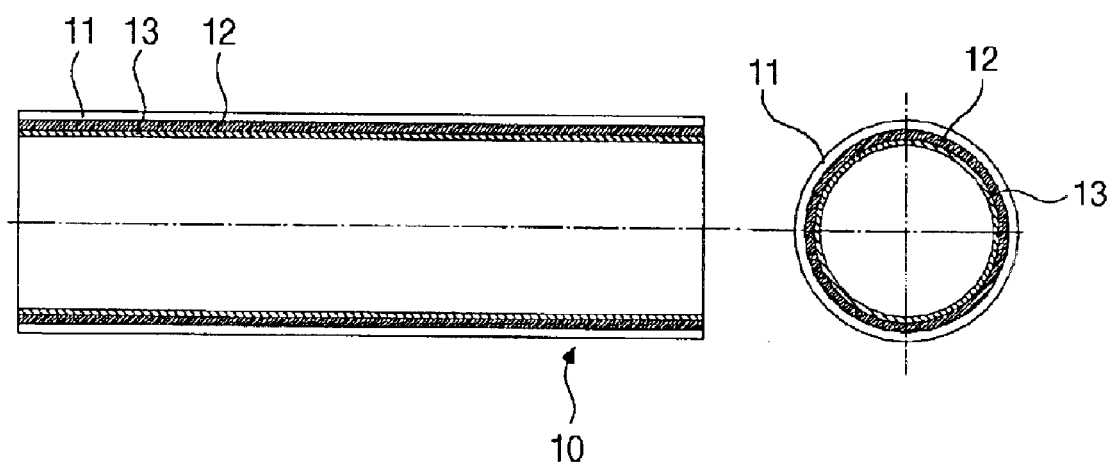
FIG. 2 is a longitudinal and a side sectional views of a transmission shaft of the propeller shaft of FIG. 1.

FIG. 1 illustrates a propeller shaft including a metal tube and a composite material prepregs stacked to an inner surface of the metal tube according to an embodiment of the present invention, and FIG. 2 is a longitudinal and a side sectional view of a transmission shaft of the propeller shaft of FIG. 1.

With reference to FIGS. 1 and 2, the propeller shaft according to the present invention comprises a transmission shaft 10 including the metal tube 11 and the composite material prepregs 12 stacked to an inner surface of the metal tube 11, and metal yokes 40 compression-fitted around both ends of the transmission shaft 10.

Additionally, a method of manufacturing the propeller shaft according to the present invention comprises the steps of stacking the composite material prepregs, 12 to the inner surface of the metal tube 11, co-cure bonding the composite material prepregs 12 stacked to the metal tube while applying the axial compressive preload to the transmission shaft 10 and creating a vacuum in the space between a vacuum tube inserted in the transmission shaft 10 and the composite material prepregs 12, and compression-fitting the metal yokes 40 around both ends of the transmission shaft 10.

Hereinafter, there will be given a detailed description of the transmission shaft 10 including the metal tube 11 and the composite material prepregs 12 stacked to the inner surface of the metal tube 11 and a method of manufacturing the transmission shaft 10 according to an embodiment of the present invention, below.

Figure 3A:
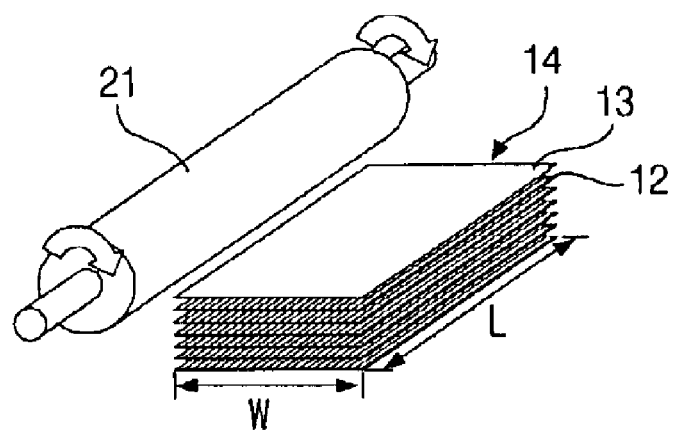
FIG. 3a illustrates the rolling process of a plurality of composite material prepregs around a mandrel to manufacture the transmission shaft of FIG. 2.
Figure 3B:
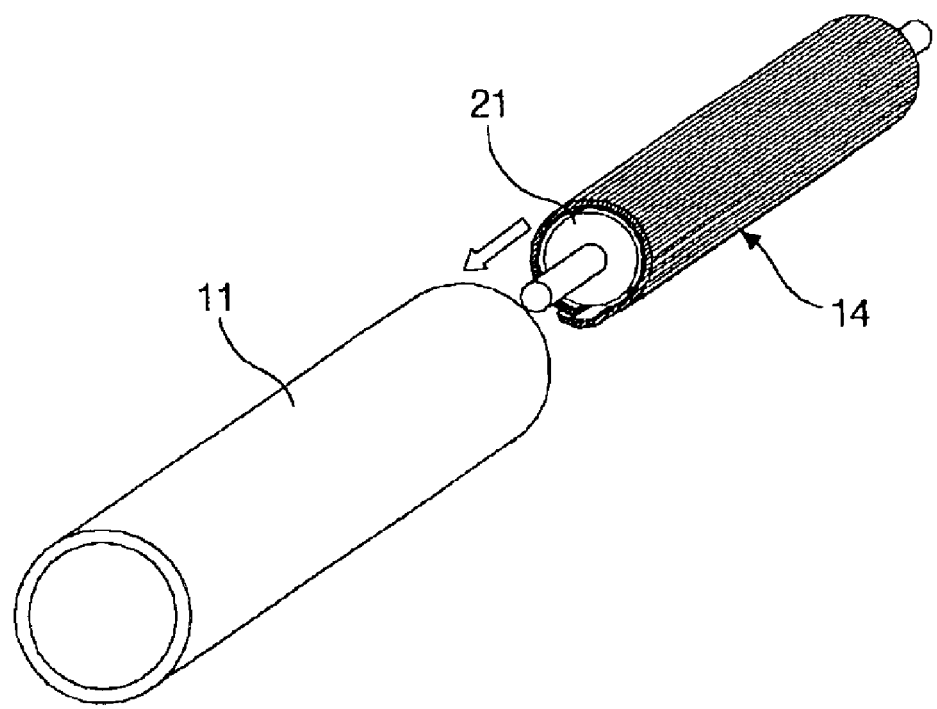
FIG. 3b illustrates the insertion process of the mandrel wrapped with the composite material prepregs into the metal tube.
Figure 3C:
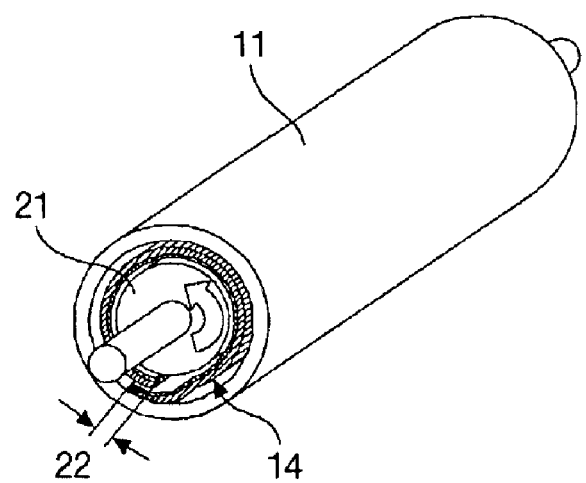
FIG. 3c illustrates the mandrel wrapped with the composite material prepregs and inserted into the metal tube.
Figure 3D:
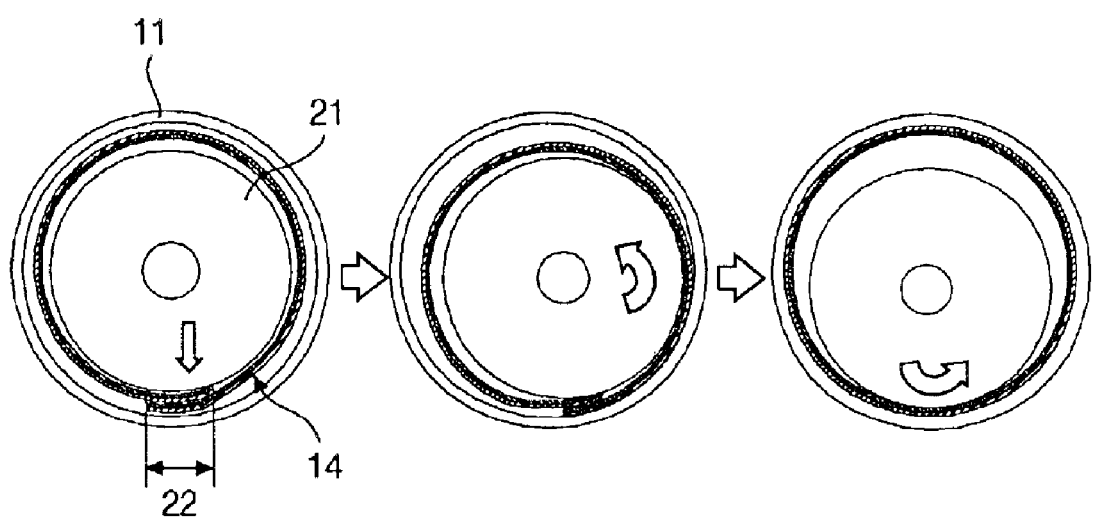
FIG. 3d illustrates the rotating process of the mandrel of FIG. 3c to stack the composite material prepregs to an inner surface of the metal tube.

FIG. 3a illustrates the rolling process of a plurality of composite material prepregs around a mandrel to manufacture the transmission shaft of FIG. 2, FIG. 3b illustrates the insertion process of the mandrel wrapped with the composite material prepregs into the metal tube, FIG. 3c illustrates the mandrel wrapped with the composite material prepregs and inserted into the metal tube, and FIG. 3d illustrates the rotating process of the mandrel of FIG. 3c to stack the composite material prepregs to an inner surface of the metal tube.

Referring to FIGS. 2 to 3d, the transmission shaft 10 includes the metal tube 11 and a composite material layer 14 stacked to the inner surface of the metal tube 11. The composite material layer 14 comprises the composite material prepregs 12 and a protective layer 14 layered on a top of the composite material prepregs 12.

Useful as the composite material prepregs 12 is a viscous prepreg capable of being bent at room temperature, for example, a carbon fiber epoxy composite material. A plurality of prepreg sheets are cut in a predetermined shape and then layered to form a prepregs. At this time, a plurality of carbon fiber composite material prepregs are layered in such a way that the stacking angle of one carbon fiber composite prepreg is transverse or fabric, while those of adjacent carbon fiber composite prepregs are close to axial direction, thereby improving radial stiffness of the transmission shaft 10 and reducing residual thermal stress of the transmission shaft 10.

At this time, a width (W) of the composite material prepregs 12 is the same as a length of an inner circumference of the metal tube 11 to which the composite material prepregs 12 is to be stacked, and a length (L) of the composite material prepregs 12 is the same as that of the metal tube 11. Additionally, the prepreg layers are surrounded with a backup film such as Teflon so as not to be sticked to each other during storage or transportation. Hence, the prepregs are stacked to the inner surface of the metal tube after the backup films are peeled off from the prepreg. Alternatively, the prepregs may is be stacked to the inner surface of the metal tube 11 without peeling off the backup film from the prepreg to use the backup film as the protective layer 13. In other words, the backup film may be used as the protective layer 13. Furthermore, instead of the backup film, a sheet or a thin rubber plate may be layered on the prepreg as the protective layer 13 after the backup film is peeled off from the prepreg. The protective layer 13 such as the backup film, sheet, or rubber plate acts as a vibration-damping layer for reducing vibration of the propeller shaft. Further, the protective layer 13 functions to prevent the mandrel 21 and the composite material prepregs 12 from being sticked to each other and to prevent overlapped portions of the composite material layer 14 from being stacked to each other to allow the composite material layer 14 to be uniformly stacked to the inner surface of the metal tube 11 as shown in FIG. 3d.

Furthermore, a bottom portion of the composite material prepregs 12 which come into contact with the inner surface of the metal tube 11 consists of a glass fiber polymeric matrix composite material. The glass fiber polymeric composite material prevents the galvanic corrosion at an interface of the composite material prepregs 12 and the metal tube 11, and reduces the residual thermal stress at the interface of the composite material prepregs 12 and the metal tube 11.

Meanwhile, a process of stacking the composite material layer 14 to the inner surface of the metal tube 11 comprises the steps of rolling the composite material layer 14 around an outer surface of the mandrel 21 in such a way that the protective layer 13 of the composite material layer 14 comes into contact with the outer surface of the mandrel 21, inserting the resulting mandrel 21 into the metal tube 11, and rotating the resulting mandrel 21 in the metal tube 11. At this time, an inner diameter of the metal tube 11 is larger than an outer diameter of the resulting mandrel 21 wrapped with the composite material layer 14, and the mandrel 21 rolls along the inner surface of the immobilized metal tube 11 while coming into contact with the inner surface of the metal tube 11, thereby desirably stacking the composite material layer 14 to the inner surface of the metal tube 11, as shown in FIG. 3d.

It is preferable to pre-heat the metal tube 11 of the transmission shaft 10 to a temperature of 30 to 80° C. so as to easily stack the composite material layer 14 to the inner surface of the metal tube 11. As well, the mandrel 21 may clockwisely or counterclockwisely rotate, but should rotate in such a way that the composite material layer 14 wrapped around the mandrel 21 is easily undone. Instead of rotating the mandrel 21 in the immobilized metal tube 11, the metal tube may eccentrically rotate around the immobilized mandrel 21 to stack the composite material layer 14 wrapped around the mandrel 21 to the inner surface of the metal tube 11.

A width (W) of the composite material layer 14 is the same as a length of an inner circumference of the metal tube 11, so the composite material layer 14 covers the whole inner surface of the metal tube 11.

After the composite material layer 14 is stacked to the inner surface of the metal tube 11, the mandrel 21 is removed from the metal tube 11. However, the protective layer 13 is not removed from the composite material layer 14, so a damping capacity of the propeller shaft is maintained in a desired level. After the composite material layer 14 is stacked to the inner surface of the metal tube 11 to form the transmission shaft 10, the transmission shaft 10 is cured.

Figure 4A:
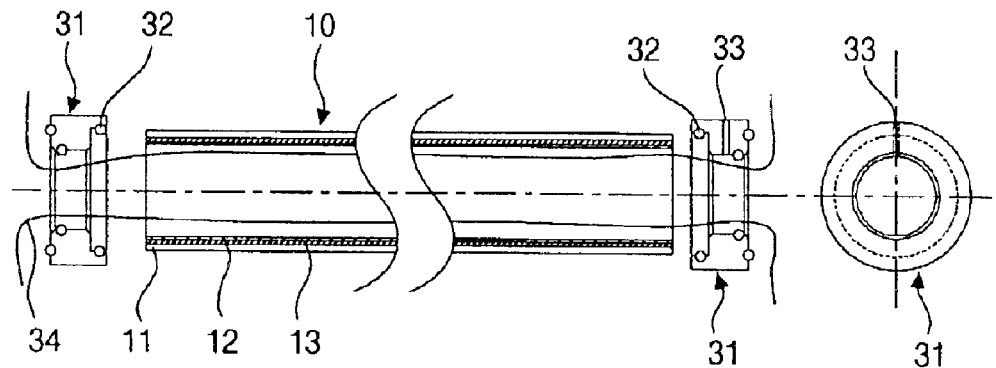
FIG. 4a illustrates a longitudinal sectional view and a side view of caps mounted on both ends of the transmission shaft of FIG. 2, and illustrates a vacuum bag inserted in the transmission shaft of FIG. 2.
Figure 4B:
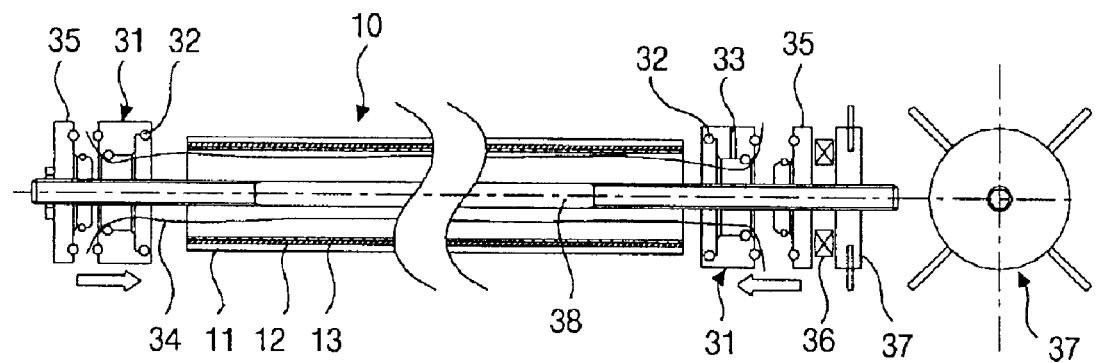
FIG. 4b illustrates dummy plugs assembled with the caps of FIG. 4a, and a thrust bearing and a jig sequentially assembled with any one of the dummy plugs.
Figure 4C:
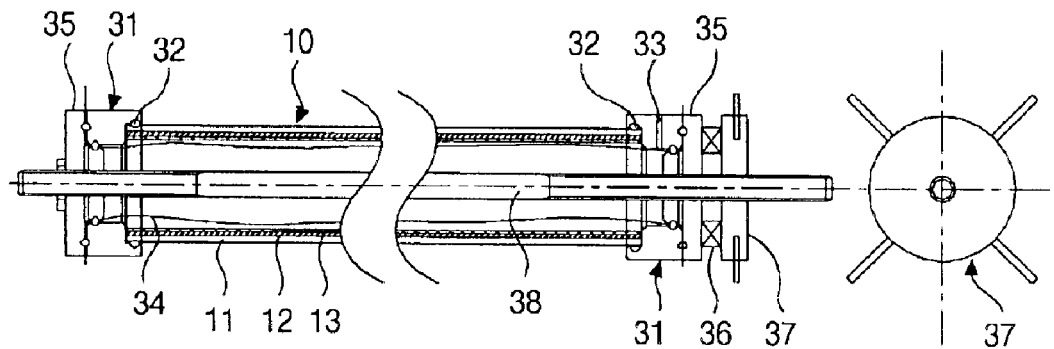
FIG. 4c illustrates a pre-compression shaft inserted in the transmission shaft of FIG. 4b, and the caps, the dummy plugs, the thrust bearing, and the jig sequentially fitted around the pre-compressed shaft.

FIG. 4a illustrates a longitudinal sectional view and a side view of caps mounted on both ends of the transmission shaft of FIG. 2, and illustrates a vacuum bag inserted in the transmission shaft of FIG. 2, FIG. 4b illustrates dummy plugs assembled with the caps of FIG. 4a, and a thrust bearing and a jig sequentially assembled with any one of the dummy plugs, and FIG. 4c illustrates a pre-compression shaft inserted in the transmission shaft of FIG. 4b, and the caps, the dummy plugs, the thrust bearing, and the jig sequentially fitted around the pre-compression shaft.

Referring to FIGS. 4a to 4c, an O-ring 32 is attached to each of the caps 31 in such a way that the O-ring 32 comes into contact with an inner surface of each cap 31, and a vent 33 is formed at a side part of each of the caps 31. The caps 31 are firmly fitted around both ends of the transmission shaft 10. Each of the caps includes a central hole through a center thereof, and the vent 33. At this time, the O-ring 32 or a rubber plate is attached to a portion of each cap which comes into contact with the transmission shaft 10.

Accordingly, the caps 31 function to airtightly close the transmission shaft 10 when an inside of the transmission shaft 10 is evacuated by eliminating air through the vent 33 from the transmission shaft 10.

Further, a vacuum bag 34 and an externally threaded pre-compression shaft 38 are sequentially inserted into the transmission shaft 10 mounted to the caps 31. The dummy plugs 35 are then assembled with sides of the caps 31 which do not come into contact with the transmission shaft 10. At this time, the dummy plugs 35 function to secondly seal the transmission shaft 10 and immovably fix the pre-compression shaft 38. Any one of the dummy plugs 35 is sequentially assembled with a thrust bearing 36 for preventing occurrence of torque and an internally threaded jig 37. The jig 37 is screwed over the pre-compression shaft 38 to apply the axial compressive preload to the transmission shaft 10, and the thrust bearing 36 functions to prevent transmittance of torque to the transmission shaft 10.

As described above, the jig 37 is screwed over the pre-compression shaft 38 to apply the axial compressive preload to the transmission shaft 10, thereby reducing the axial thermal residual stresses of the transmission shaft 10. In detail, a shear displacement of the transmission shaft 10 due to a restoring force of the metal tube 11 after the high temperature of the transmission shaft is decreased offsets a shrinkage displacement owing to thermal expansion of the transmission shaft 10. For this reason, the length of metal tube 11 is decreased to the same level as the composite material prepregs 12. Additionally, a vacuum pump is connected to the vent 33 of each cap 31 to remove the air in the space between the composite material layer and the vacuum bag while an axial compressive preload is applied to the transmission shaft 10 during co-cure bonding the transmission shaft 10.

The transmission shaft 10 is then cooled to room temperature, and the jig 37, the thrust bearing 36, the dummy plugs 35, the caps 31, and the pre-compression shaft 38 are sequentially disassembled from the metal tube. The vacuum tube 34 is easily separated from the metal tube because the vacuum tube 34 does not come into contact with the composite material prepregs stacked to the inner surface of the metal tube but with the protective layer 13.

Figure 5:
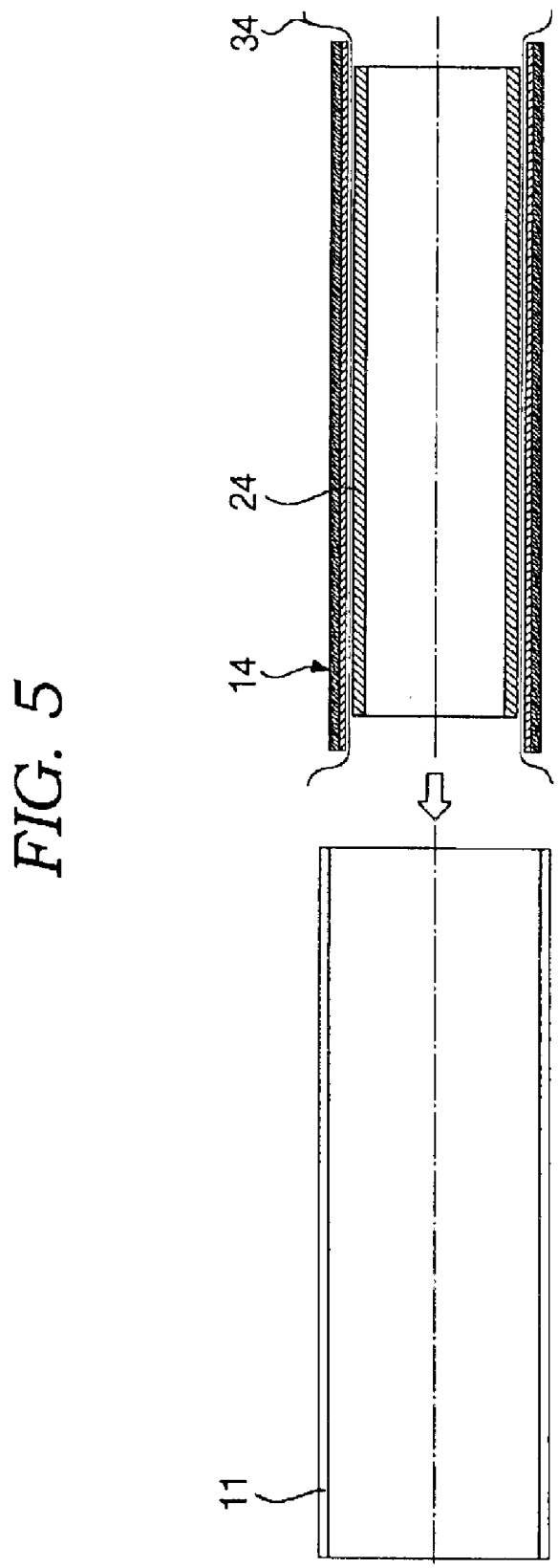
FIG. 5 illustrates a transmission shaft according to another embodiment of the present invention, in which a mandrel wrapped with the composite material prepregs is concentrically fitted into a metal tube.

Turning now to FIG. 5, there is illustrated a transmission shaft manufactured according to another embodiment of the present invention.

A detailed description of a process of manufacturing the transmission shaft will be given, below.

A hollow mandrel 24 is inserted into a vacuum bag 34, and the vacuum bag 34 is then wrapped with a composite material layer 14. At this time, an outer diameter of the resulting mandrel is almost the same as or slightly smaller than an inner diameter of a metal tube 11. The mandrel 24 wrapped with the composite material layer 14 is inserted into the metal tube 11 to allow the composite material layer 14 to temporarily come into contact with an inner surface of the metal tube 11.

A pre-compression shaft is then inserted into the hollow mandrel 24 after the mandrel 24 is inserted into the metal tube 11. Caps, dummy plugs, and a jig are assembled with the metal tube, and the composite material layer stacked to the metal tube is then co-cure bonded while applying the axial compressive preload to the transmission shaft and removing the air in the space between the vacuum bag inserted in the transmission shaft and the composite material layer. At this time, a length of the mandrel 24 is shorter than that of the metal tube. Accordingly, the caps fitted around the metal tube do not come into contact with the mandrel. Additionally, the mandrel 24 contributes to stacking the composite material layer to the inner surface of the metal tube in a predetermined thickness without separation of the composite material layer from the inner surface of the metal tube. After completion of co-cure bonding of the composite material layer, the mandrel 24 is separated from the metal tube to form the desired transmission shaft 10.

The transmission shaft 10 thus formed is fitted into metal yokes 40 to complete a propeller shaft.

Now, there will be given a detailed description of the metal yokes and the fitting process of the transmission shaft into the metal yokes.

Figure 6A:
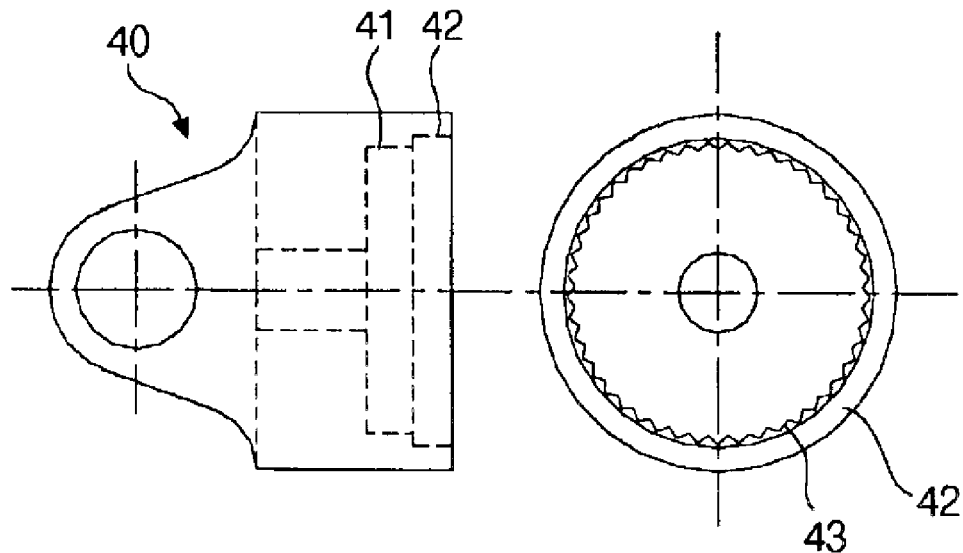
FIG. 6a is a longitudinal sectional view and a side view of each of first metal yokes mounted on both ends of the transmission shaft of FIG. 2.
Figure 6B:
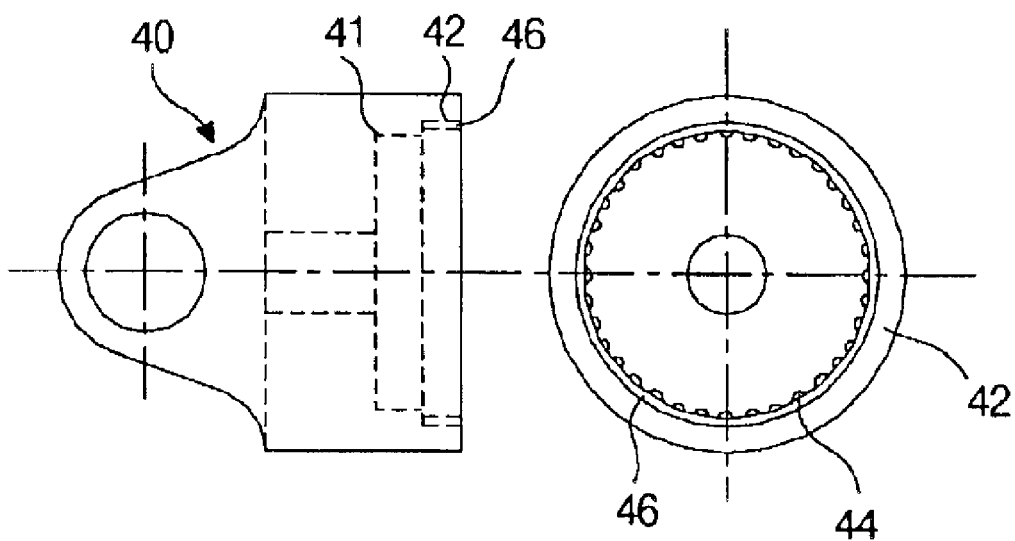
FIG. 6b is a longitudinal sectional view and a side view of each of second metal yokes mounted on both ends of the transmission shaft of FIG. 2.
Figure 7:
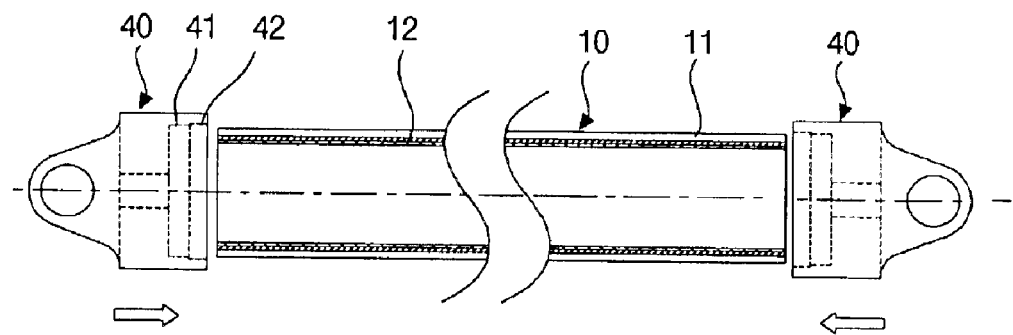
FIG. 7 is a partial longitudinal sectional view of the propeller shaft including the transmission shaft of FIG. 2 and the metal yokes mounted on both ends of the transmission shaft.
Figure 8:
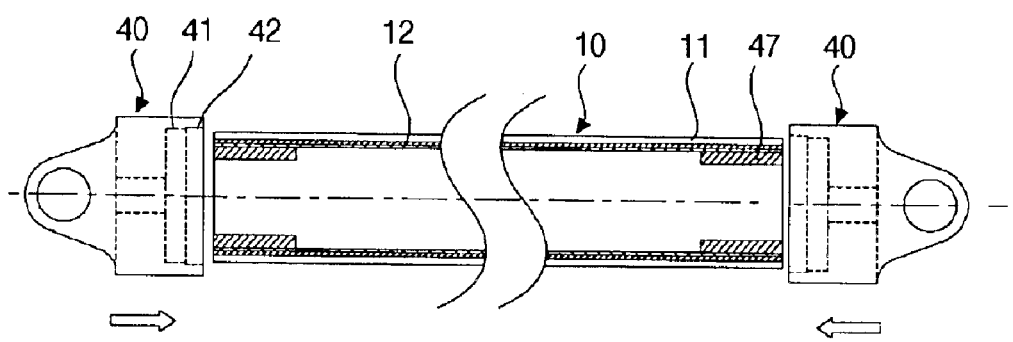
FIG. 8 illustrates longitudinal sectional views of the metal yokes mounted on both ends of the transmission shaft of FIG. 2 in the case of embedding inserts in the transmission shaft.
Figure 9A:
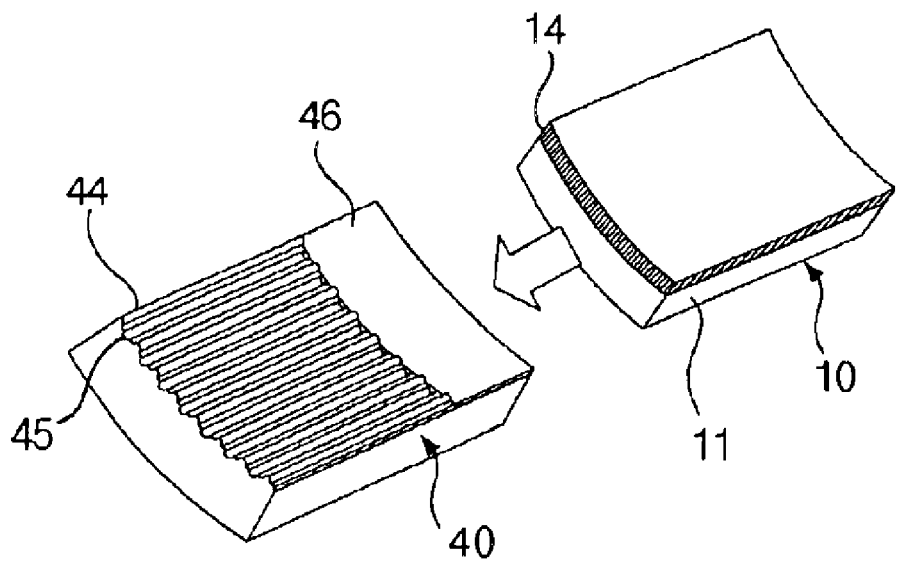
FIG. 9a illustrates the compression-fitting process of the transmission shaft into any one of the metal yokes of FIG. 7, in which the transmission shaft and metal yoke are exploded away to show their interior construction.
Figure 9B:
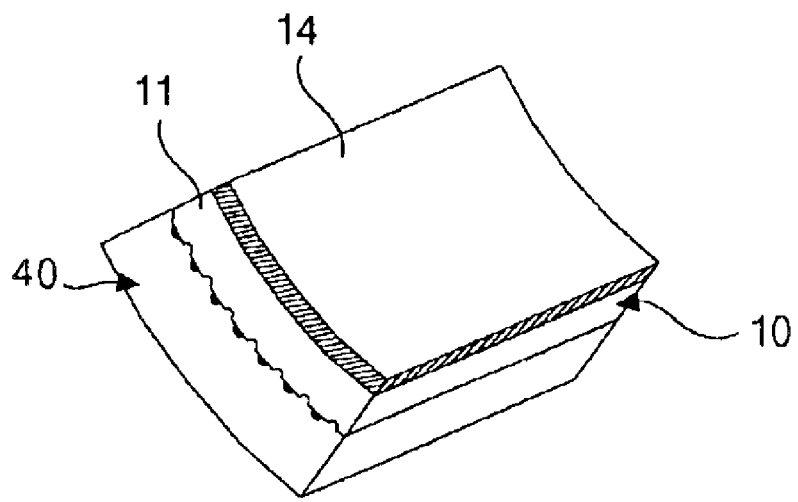

FIG. 6a is a longitudinal sectional view and a side view of each of first metal yokes mounted on both ends of the transmission shaft of FIG. 2, FIG. 6b is a longitudinal sectional view and a side view of each of second metal yokes mounted on both ends of the transmission shaft of FIG. 2, FIG. 7 is a partial longitudinal sectional view of the propeller shaft including the transmission shaft of FIG. 2 and the metal yokes mounted on both ends of the transmission shaft, FIG. 8 illustrates longitudinal sectional views of the metal yokes mounted on both ends of the transmission shaft of FIG. 2 in the case of embedding inserts in the transmission shaft, FIG. 9a illustrates the compression-filling process of the transmission shaft into any one of the metal yokes of FIG. 7, in which the transmission shaft and metal yoke are exploded away to show their interior construction, and FIG. 9b is a perspective view, partly exploded away to show the interior construction of the transmission shaft compression-fitted into the metal yoke of FIG. 9a.

Referring to FIGS. 6a to 9b, the transmission shaft 10 is compression-fitted into the metal yokes 40 at both ends thereof, and a fitting bore part 41 and a guide bore part 42 are stepwisely formed in each of the metal yokes 40. The guide bore part 42 is functions to guide the transmission shaft 10 so that a center of the transmission shaft 10 corresponds to that of each metal yoke 40 when the transmission shaft 10 is fitted into the metal yokes 40, and an inner diameter of the guide bore part 42 is slightly larger than that of the fitting bore part 41. Additionally, the guide bore part may be formed in such a way that its diameter is gradually decreased in a direction toward a center of an inside end of each of the metal yokes 40 so as to desirably fit the transmission shaft 10 into the metal yokes 40. Further, a plurality of teeth 43 or embossments 44 are formed on an inner surface of the fitting bore part 41 so as to desirably compression-fit the transmission shaft 10 into the fitting bore part 41, as shown in FIGS. 6a and 6b.

Furthermore, a ring-shaped rubber packing 46 is stacked to an inner surface of the guide bore part 42, and its inner diameter is almost the same as the outer diameter of the transmission shaft 10. In other words, the rubber packing 46 functions to prevent moisture or impurities from infiltrating into the metal yokes 40 when the transmission shaft 10 is fitted into the metal yokes 40 to prolong a fatigue life of the propeller shaft and suppress vibration of the propeller shaft. Additionally, an adhesive is pasted on inner surfaces of the fitting bore part 41 and rubber packing 46 so as to prevent moisture or impurities from infiltrating into the metal yokes 40 when the transmission shaft 10 is fitted into the metal yokes 40 and to desirably fit the transmission shaft into the metal yokes 40. Moreover, adhesive-retaining grooves 45 are formed between embossments 44 on the inner surface of the fitting bore part 41, and the adhesive is filled in the grooves 45. In the case of forming the large-sized grooves 45, an amount of the adhesive filled in the grooves 45 is increased, thus improving fatigue properties and a static torque capacity of the transmission shaft 10, and desirably fitting the transmission shaft 10 into the metal yokes 40 (refer to FIGS. 6b, 9a, and 9b).

As in FIG. 7, both ends of the transmission shaft 10 are fitted into the metal yokes 40. In detail, both ends of the transmission shaft 10 are respectively is compression- or thermal-fitted into the guide bore parts 42 of the metal yokes 40 in such a way that central axes of the transmission shaft 10 and the metal yokes correspond in position to each other. At this time, teeth 43 or embossments 44 are formed around the metal tube 11 of the transmission shaft 10, and the teeth 43 or embossments 44 of the metal tube 11 engage with those of the metal yokes 40. Furthermore, compressive stress is generated at interfaces of the transmission shaft 10 and the metal yokes 40, thus desirably increasing fretting fatigue strength of the propeller shaft.

Moreover, inserts 47 may be selectively embedded in the transmission shaft 10 as shown in FIG. 8. The inserts 47 function to prevent the transmission shaft 10 from circumferentially buckling when the transmission shaft 10 is fitted into the metal yokes 40, and to support a shape of the transmission shaft 10 to allow the embossments 44 of the metal yokes 40 to axially apply the compressive stress to the transmission shaft 10.

As well, the transmission shaft 10 may be fitted into the metal yokes 40 after the metal yokes 40 are heated. In other words, the metal yokes 40 are heated, the transmission shaft 10 is fitted into the heated metal yokes 40, and the resulting metal yokes 40 are then cooled, thereby allowing the teeth 43 or embossments 44 of the metal yokes 40 to readily engrave embossments 44 around the metal tube 11 to desirably engage the metal tube 11 with the metal yokes 40.

A better understanding of the present invention may be obtained in light of the following examples which are set forth to illustrate, but are not to be construed to limit the present invention.

EXAMPLE

Metal yokes 40 consisting of steel were prepared. An outer diameter of each of the metal yokes 40 was 96 mm, and an inner diameter of a fitting bore part 41 was 89.75 mm. A depth of the fitting bore part 41 was 10 mm, and embossments formed on an inner surface of the fitting bore part 41 each had a width of 0.25 mm and a depth of 0.125 mm. Additionally, a metal tube 11 consisting of aluminum had an outer and an inner diameter of 90 and 86 mm.

The transmission shaft 10 was compression-fitted into the metal yokes 40 by the aid of an axial compression force of 14 kN to form a propeller shaft, as shown in FIG. 1. At this time, the propeller shaft had a predetermined insertion length (L) of the transmission shaft into each metal yoke 40.

A rotating force was applied to the propeller shaft to observe the static fracture point in the fitting bore part of the propeller shaft. The static fracture point occurred in the fitting bore part of the propeller shaft at a torque capacity of 4300 Nm, and an average fracture shear strength of the propeller shaft was about 34 MPa. This value was about 4.3 times higher than the average fracture shear strength (8 MPa) of a conventional propeller in which serrations are formed on outer surfaces of both ends of the transmission shaft and inner surfaces of the metal yokes.

Further, an axial compression force of 14 kN was needed to compress the metal yokes 40 into the transmission shaft 10 of the propeller shaft. This value was much smaller than that of the conventional propeller shaft. The reason for this is that the transmission shaft of the present invention is fitted into the metal yokes with the use of an adhesive, and a relatively small number of embossments are formed on the inner surfaces of the metal yokes.

Furthermore, the propeller shaft of the present invention had relatively high torque transmissibility of 4300 Nm even though the propeller shaft had the shorter joining length (10 mm) than the conventional propeller shaft. The reason for this is that an aluminum tube of the transmission shaft 10 is fitted into the metal yokes 40 with the use of an adhesive filled in adhesive-retaining grooves of the aluminum tube, and fatigue strength of the propeller shaft is improved due to axial compression stress in the fitting bore part of the propeller shaft.

Moreover, the propeller shaft of the present invention rotated 1,500,000 cycles at a dynamic torque of 0 to 1500 Nm without any failure. This means that the propeller shaft of the present invention has a better performance than the conventional propeller shaft.

As described above, the propeller shaft of the present invention is advantageous in that the propeller shaft consists of a composite material part and a metal material part, so ensuring improved impact, abrasion, and water resistance.

Additionally, a transmission shaft is compression-fitted into metal yokes including teeth and embossments formed on inner surfaces thereof, thereby securing low production cost, and improving torque transmissibility and fatigue life of the propeller shaft without degradation of its physical properties, natural vibration frequency, and damping ratio of the composite material prepregs even though an insertion length of the transmission shaft into the metal yokes is relatively short.

Furthermore, a mandrel and a composite material prepregs are not stacked to each other because of a protective layer provided therebetween, thus desirably stacking the composite material prepregs to an inner surface of a metal tube, thereby improving productivity of the propeller shaft according to the present invention.

Another advantage of the present invention is that a process of applying an axial compressive preload to a metal tube and a process of applying a vacuum to the space between a vacuum bag and a composite material layer are simultaneously conducted, thereby improving productivity of the propeller shaft.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method of manufacturing a propeller shaft, which includes a transmission shaft having a metal tube and a high specific modulus composite material prepregs stacked to an inner surface of the metal tube, and yokes mounted on both ends of the transmission shaft, comprising the steps of:

stacking the composite material prepregs to the inner surface of the metal tube;

co-cure bonding the composite material prepregs stacked to the inner surface of the metal tube while applying pressure to the surface of the composite material prepregs; and mounting the yokes on both ends of the transmission shaft;

wherein the stacking step comprises a first step of preparing composite material prepregs; a second step of wrapping the composite material prepregs around a mandrel; a third step of inserting the mandrel wrapped with the composite material prepregs into the metal tube; and a fourth step of stacking the composite material prepregs wrapped around the mandrel to the inner surface of the metal tube; and wherein a protective layer is stacked to the composite material prepregs so as to improve a damping capacity of the propeller shaft, and the composite material prepregs is wrapped around the mandrel in such a way that the protective layer is placed between the composite material prepregs and the mandrel in the second step.

2. The method as set forth in claim 1, wherein the co-cure bonding step comprises a first step of fitting caps to both ends of the transmission shaft; a second step of sequentially inserting the vacuum bag and an pre-compression shaft through central holes of the caps into the transmission shaft; a third step of rotatably fitting a jig, rotatably assembled with one of the caps, around the pre-compression shaft; and a fourth step of rotating the jig to apply a pre-compression to both sides of the metal tube while creating vacuum in a space between the vacuum tube and the composite material prepregs.

3. The method as set forth in claim 2, wherein rings or rubber plates are provided between the caps and end portions of the metal tube so as to airtightly close the space between the vacuum bag and the composite material prepregs.

4. The method as set forth in claim 3, wherein a vent is formed in a lateral part of each of the caps to evacuate air from the space between the vacuum tube and the composite material prepregs.

5. The method as set forth in claim 2, wherein dummy plugs are assembled with the caps and fitted around the pre-compression shaft to airtightly seal intervals between the pre-compression shaft and the central holes of the caps in the second step.

6. The method as set forth in claim 2, wherein a thrust bearing is assembled with any one of the caps and the jig in such a way that the thrust bearing is located between them to reduce torque caused by rotation of the jig in the third step.

7. The method as set forth in claim 1, wherein the metal tube is pre-heated to facilitating the stacking of the composite material prepreg to the inner surface of the metal tube before the fourth step.

8. The method as set forth in claim 1, wherein, in the fourth step, the mandrel rolls along the inner surface of the metal tube while the metal tube being immobilized.

9. The method as set forth in claim 1, wherein, in the fourth step, the mandrel is immobilized and the metal tube rotates about an axis eccentric to an axis of the mandrel.

10. The method as set forth in claim 1, wherein the yokes are compression-fitted around the both ends of the transmission shaft while teeth or embossments formed on inner surfaces of the yokes bite an outer surface of the metal tube.

11. The method as set forth in claim 10, wherein the yokes are heated before being fitted around the both ends of the metal tube.

12. The method as set forth in claim 10, wherein an adhesive is pasted on inner surfaces of the yokes or around outer surfaces of the both ends of the metal tube before the yokes are fitted around the metal tube.

13. The method as set forth in claim 10, wherein rubber packings are inserted to inner surfaces of the yokes to prevent moisture or impurities from infiltrating into the yokes when the yokes are fitted around the both ends of the metal tube.

14. The method as set forth in claim 10, wherein inserts having an outer diameter almost the same as an inner diameter of the metal tube are inserted into the metal tube before the yokes are fitted around the both ends of the metal tube.

15. A method of manufacturing a propeller shaft, which includes a transmission shaft having a metal tube and a high specific modulus composite material prepregs stacked to an inner surface of the metal tube, and yokes mounted on both ends of the transmission shaft, comprising the steps of:

stacking the composite material prepregs to the inner surface of the metal tube;

co-cure bonding the composite material prepregs stacked to the inner surface of the metal tube while applying pressure to the surface of the composite material prepregs; and mounting the yokes on both ends of the transmission shaft;

wherein the stacking step comprises the steps of inserting a hollow mandrel into the vacuum bag; wrapping the composite material prepregs around the vacuum bag, said composite material prepregs wrapped around the vacuum bag having an outer diameter almost the same as or slightly smaller than an inner diameter of the metal tube; and inserting the hollow mandrel wrapped with the composite material prepregs into the metal tube.

16. The method as set forth in claim 15, wherein the co-cure bonding step comprises a first step of fitting caps around both ends of the metal tube; a second step of inserting a pre-compression shaft into the hollow mandrel in such a way that the pre-compression shaft is inserted through central holes of the caps; a third step of rotatably fitting a jig, rotatably assembled with any one of the caps, around the pre-compression shaft; and a fourth step of rotating the jig to apply the pre-compression load to both sides of the metal tube while creating vacuum in a space between the vacuum bag and the composite material prepregs.

* * * * *